Patented Feb. 25, 1941

2,232,917

UNITED STATES PATENT OFFICE 2,232,917

VANADIC ACID ESTERS OF TETRAHYDRO-FURFURYL ALCOHOL

William H. Hill, Mount Lebanon, Pa., assignor to American Cyanamid Company, New York, N. Y., a corporation of Maine No Drawing. Original application November 18, 1939, Serial No. 305,173. Divided and this application July 10, 1940, Serial No. 344,692

2 Claims. (Cl. 260—345)

This invention relates to the vanadic acid esters of tetrahydrofurfuryl alcohol.

This is a division of my copending application Serial No. 305,173, filed November 18, 1939, Patent 2,220,041, Oct. 29, 1940.

Vanadium compounds such as vanadium pentoxide have been extensively used as solid oxidation catalysts in a great many reactions, for example converting sulfur dioxide to trioxide, sugar to oxalic acid, naphthalene to phthalic anhydride, anthracene to anthraquinone. Many of the above reactions are carried out in the vapor phase in which a gaseous mixture of the reacting substances is passed over the vanadium pentoxide. In this type of reaction it is important that the temperature be controlled within a certain range. If the temperature rises too high, complete combustion takes place to an increasing extent and the yields are correspondingly lower. Many of these disadvantages are avoided by liquid phase oxidations. The conditions under which these oxidations are carried out in general are more easily controlled than the vapor phase oxidation reaction. However, the vanadium compound generally available heretofore have not been soluble in organic liquids and hence could not be used effectively in liquid phase oxidation reactions.

According to the present invention various vanadic acid esters of tetrahydrofurfuryl alcohol are produced which have unusual properties of considerable commercial importance. They are generally soluble in organic liquids and particularly petroleum products such as fuel oil and hence can be used to improve the burning characteristics of fuel oil.

Another field for the use of these compounds is in the oxidizing of organic compounds in the gaseous and especially liquid phase oxidation procedures. These vanadic esters also exhibit extreme opacity to ultraviolet light and are useful as light screens in various lacquers or resinous compositions to block out undesirable short light wave radiations. They may also be incorporated into nitrocellulose and cellulose acetate sheet material to exclude harmful light rays. Certain of the vanadic esters of the present invention have been found to be useful in paints and varnishes as driers. The improved solubility properties of these esters make them particularly useful as driers and they produce a rapid and uniform oxidation of paint and varnish coatings.

It is not necessary that the vanadic esters of the present invention be in a pure form to be useful in the various operations as pointed out above. Catalytic action and opacity to ultraviolet light is due to vanadium itself. The compositions of the present invention therefore may be either the ortho, meta, or polyvanadic esters of tetrahydrofurfuryl alcohol or mixtures and solutions of the various esters.

The following example will further illustrate the present invention.

Technical 85% $V_2O_5$ in excess was boiled with tetrahydrofurfuryl alcohol for about two hours and filtered. The solution was very dark with a greenish tint. Upon the addition of water a yellow coloration was produced which indicated that tetrahydrofurfuryl vanadate had been produced. The solution was found to be miscible with kerosene and a heavy petroleum oil.

The esters of the present invention may be produced in the form of a mixture of esters of ortho, meta, and higher polyvanadic acids. The proportions of the particular esters will vary with temperature, light, presence of moisture, and the like. In general, high temperatures and the presence of moisture result in a larger proportion of the meta and higher polyvanadates. Except for the fact that the polyvanadic esters are colored, whereas the ortho esters are light colored or colorless, the esters are substantially equivalent for most commercial uses, and the exact composition of a particular mixture is not usually of importance. Where it is desirable to separate the esters, this can be simply effected by suitable fractional distillation, preferably under vacuum. Another method of isolating the individual esters is by cooling and concentration. These procedures materially increase the cost of the product and for most uses the isolated esters do not produce any advantage.

What I claim is:

1. The reaction products of vanadium pentoxide and tetrahydrofurfuryl alcohol.

2. An ester of tetrahydrofurfuryl alcohol and vanadic acid.

WILLIAM H. HILL.